United States Patent
Nishi et al.

[11] Patent Number: 5,960,551
[45] Date of Patent: Oct. 5, 1999

[54] ROTARY LASER IRRADIATING SYSTEM

[75] Inventors: Masayuki Nishi; Satoshi Hirano, both of Tokyo-to, Japan

[73] Assignee: Kabushiki Kaisha Topcon, Tokyo, Japan

[21] Appl. No.: 08/895,683

[22] Filed: Jul. 17, 1997

[30] Foreign Application Priority Data

Jul. 22, 1996 [JP] Japan .................................. 8-210574

[51] Int. Cl.⁶ ............................................................ G01C 5/00
[52] U.S. Cl. ............................................................... 33/292
[58] Field of Search .............................. 33/290, 291, 292, 33/293, DIG. 21

[56] References Cited

U.S. PATENT DOCUMENTS

| | | | |
|---|---|---|---|
| 786,093 | 3/1905 | Bostrom | 33/292 |
| 1,552,318 | 9/1925 | Lane | 33/290 |
| 4,691,444 | 9/1987 | Capps | 33/290 |
| 5,485,266 | 1/1996 | Hirano et al. | 33/291 |

FOREIGN PATENT DOCUMENTS

| | | | |
|---|---|---|---|
| 358449 | 8/1920 | Germany | 33/292 |
| 1151817 | 4/1985 | U.S.S.R. | 33/292 |
| 556379 | 10/1943 | United Kingdom | 33/292 |

*Primary Examiner*—G. Bradley Bennett
*Attorney, Agent, or Firm*—Nields, Lemack & Dingman

[57] ABSTRACT

A rotary laser irradiating system, comprising a laser projector for performing rotary irradiation of a laser beam, a collimating telescope having a collimation axis in a projecting direction of the laser beam, and a rotation base where the collimating telescope can be rotated around an axial line running perpendicularly to the collimation axis and can be fixed at a predetermined position, whereby the collimating telescope is used for the setting of a tilting direction, and the collimating telescope is rotated when necessary, and collimation can be performed at least in two directions.

7 Claims, 5 Drawing Sheets

10
ROTARY LASER IRRADIATING SYSTEM

BACKGROUND OF THE INVENTION

The present invention relates to a rotary laser irradiating system, by which it is possible to form a reference point, a reference line and or a reference plane for measurement by irradiating a laser beam or by performing reciprocal scanning or by rotating a laser beam, and in particular to a rotary laser irradiating system which can form, in addition to a horizontal reference plane, an arbitrary tilt setting plane tilted at a predetermined angle with respect to the horizontal reference plane.

To obtain a horizontal reference level for wide range, a rotary laser irradiating system is used instead of an optical leveling device.

In recent years, the use of the rotary laser irradiating system has been widely propagated for measurement in a height direction, in particular, in case a line, a plane, etc. are formed according to a reference height. The rotary laser irradiating system of this type is designed in such manner that a laser beam is irradiated in a horizontal direction while it is rotated or it is irradiated for reciprocal scanning or it is stopped to form a rotary reference plane, or to form a partial reference line, or a reference plane, and further, a reference line and a reference point.

For example, the system of this type is used to form a reference horizontal line for positioning of a window frame in interior construction of a building, or to form a reference horizontal plane when soil filling is performed in civil engineering and a graded soil surface is formed. In some of the rotary laser irradiating systems of this type, a reference plane tilted in a direction or in two directions can be formed, and it is now possible to form a tilted reference plane easily.

As an example of a conventional type rotary laser irradiating system, brief description will be given below on the rotary laser irradiating system disclosed in JP-A-6-26861 referring to FIG. 6.

At the center of the upper surface of a casing 1, a recessed portion 2 in truncated conical shape is formed. A laser projector 3 penetrates vertically through the center of the recessed portion 2 and is tiltably supported on the recessed portion 2 via a spherical seat 4. The head of the laser projector 3 is provided with a pentagonal prism 9 and serves as a rotator 5, which can be rotated freely. The rotator 5 is rotated by a scanning motor 6 via a driving gear 7 and a scanning gear 8.

On the circumference of the laser projector 3, two sets of tilting mechanisms 10 (only one of them is shown in the figure) is provided. The tilting mechanism 10 comprises a tilting motor 11, a tilting screw 12, and a tilting nut 13. The tilting motor 11 rotates the tilting screw 12 via a driving gear 14 and a tilting gear 15, and the tilting nut 13 is connected with the laser projector 3 via a tilting arm 16. Driven by the tilting motor 11, the tilting nut 13 is moved up or down, and the laser projector 3 is tilted by upward or downward movement of the tilting nut 13.

On the middle portion of the laser projector 3, there are provided a fixed tilt sensor 18 in parallel to the tilting arm 16 and a fixed tilt sensor 19 placed perpendicularly to the fixed tilt sensor 18. On the lower end of the laser projector 3, a flange 20 is fixed. On a pivot pin 21 erected on the flange 20, an L-shaped tilting base 22 is supported at one point on the corner. Two ends of the tilting base 22 at positions perpendicularly to each other are connected to two sets of tilt setting mechanisms 25 (only one of them is shown in the figure) respectively. On the tilting base 22, an angle setting tilt sensor 29 is arranged in the same direction as the fixed tilt sensor 18, and an angle setting tilt sensor 30 is arranged in the same direction as the fixed tilt sensor 19.

The tilt setting mechanism 25 comprises a tilt angle setting motor 26, a tilt setting screw 27 rotated by the tilt angle setting motor 26, and a nut block 28 screwed on the tilt setting screw 27, and one end of the tilting base 22 is engaged with the nut block 28. By driving the tilt angle setting motor 26, the nut block is moved up or down via the tilt setting screw 27, and the tilting base 22 is tilted.

Inside the laser projector 3, there are provided a laser emitter (not shown) and a projection optical system (not shown), which comprises components such as collimator lens, which turns the laser beam emitted from the laser emitter to parallel beams. The laser beam from the projection optical system is deflected in a horizontal direction by the pentagonal prism 9 and is irradiated through a projection window 31.

On the upper surface of the rotary laser irradiating system, a sight (foresight/backsight) 32 is provided. Using this sight 32, it is possible to perform collimation in two directions, i.e. a tilting direction by the tilting mechanism 10, and also another tilting direction perpendicular to the above tilting direction by another tilting mechanism (not shown).

Description will be given now on a procedure to form a tilting reference plane by the above rotary laser irradiating system referring to FIG. 7.

The rotary laser irradiating system 35 is installed on a tripod 33 erected at the reference position. At the position of a target in a tilting direction, a collimation target 36 is erected (FIG. 7(A)). When a laser beam irradiating from the rotary laser irradiating system 35 is projected in the reference direction, i.e. when the projecting direction of the laser beam is consistent with a tilting direction of the laser projector 3 tilted by the tilting mechanism 10 and the fixed tilt sensors 18 and 19 both indicate a horizontal direction, fixing screws of the tripod 33 are loosened so that main unit of the rotary laser irradiating system 35 can be rotated with respect to the tripod 33. While collimation is performed through the sight 32, the rotary laser irradiating system 35 is rotated. The collimation target 36 is collimated through the sight 32 and the projecting direction is aligned with the collimation target 36 (FIGS. 7(B) and (C)). Next, a tilt angle θ is set, and a laser beam is projected, and a reference line is formed (FIG. 7(D)).

The tilt angle is set by the tilt setting mechanism 25. When the fixed tilt sensors 18 and 19 indicate a horizontal direction, the tilt angle setting motor 26 is driven to rotate the tilt setting screw 27. Then, the nut block 28 is moved up or down, and the tilting base 22 is tilted at the same angle as the setting angle θ, but in a direction reverse to that of the setting angle. The tilt angle of the tilting base 22 is detected by an encoder, etc. connected to the tilt angle setting motor 26.

Next, the laser projector 3 is tilted in the tilting direction by the tilting mechanism 10. When the tilting base 22 detects a horizontal direction, a tilt angle is the setting tilt angle of the laser projector 3. When the tilt angle of the laser projector 3 is at the preset angle, a laser beam is projected in a horizontal direction from the laser projector 3 through the pentagonal prism 9, and the rotator 5 is rotated, or reciprocal scanning is performed in the range of a desired angle. Then, a tilted reference plane is formed.

As described above, in the conventional type rotary laser irradiating system, the tilt angle is electrically detected by the tilt sensor and is electrically set by the tilting mechanism 10, and it is possible to perform the setting at high accuracy. However, the tilting direction is determined by the sight 32. Originally, collimation by sight can be performed without requiring high-grade technique. Because sophisticated technique is not needed, the accuracy of collimation is not very high. Further, there is also man-made error, and the decrease of accuracy is unavoidable. In civil engineering work in the past, high accuracy has not been required, and collimation by sight has been satisfactory for the purpose, but in the almost completely mechanized civil engineering work in recent years, higher accuracy is required, and the accuracy of collimation has become an important issue. Further, performance characteristics of the rotary laser irradiating system itself has been improved, and when it is used for the surveying for remote site, collimation itself has become difficult using the sight as described above.

In some cases, a collimating telescope is used instead of the foresight/backsight, but it is not possible to collimate in two directions perpendicular to each other as in the case of the foresight/backsight. In case it is wanted to collimate in two directions, the collimating telescope has to be re-arranged each time. This means much labor and time for the work and hence poor working efficiency. Accuracy is an issue in re-arranging the collimating telescope.

SUMMARY OF THE INVENTION

It is another object of the present invention to make it possible to collimate at least in two directions and to improve the accuracy of collimation.

To attain the above objects, the system according to the present invention comprises a laser projector for performing rotary irradiation of a laser beam, a tilting mechanism for tilting said laser projector in predetermined directions, a collimating telescope for collimating at least in said predetermined directions, a rotation base where the collimating telescope is rotatably supported around a rotation axis running perpendicularly to a collimation axis, and positioning means for fixing said collimating telescope at predetermined rotating positions. Also, according to the present invention said tilting mechanism of the system tilts said laser projector in two directions perpendicularly to each other, and said positioning means of the system can fix said collimating telescope at least in two directions. Also, according to the present invention said positioning means of the system has a V-groove in the direction of the length of the collimating telescope. Also, according to the present invention said positioning means of the system has two V-grooves which are provided on said rotation base and are running perpendicularly to each other, and a spring for pushing the collimating telescope toward said rotation base, and said collimating telescope can be placed to or removed from said V-grooves. Further, according to the present invention said collimating telescope of the system is provided on the upper surface of said rotary laser irradiating system.

DETAILED DESCRIPTION OF THE PREFERRED EMBODIMENT

In the following, description will be given on an embodiment of the present invention referring to the attached drawings.

Figure 1:
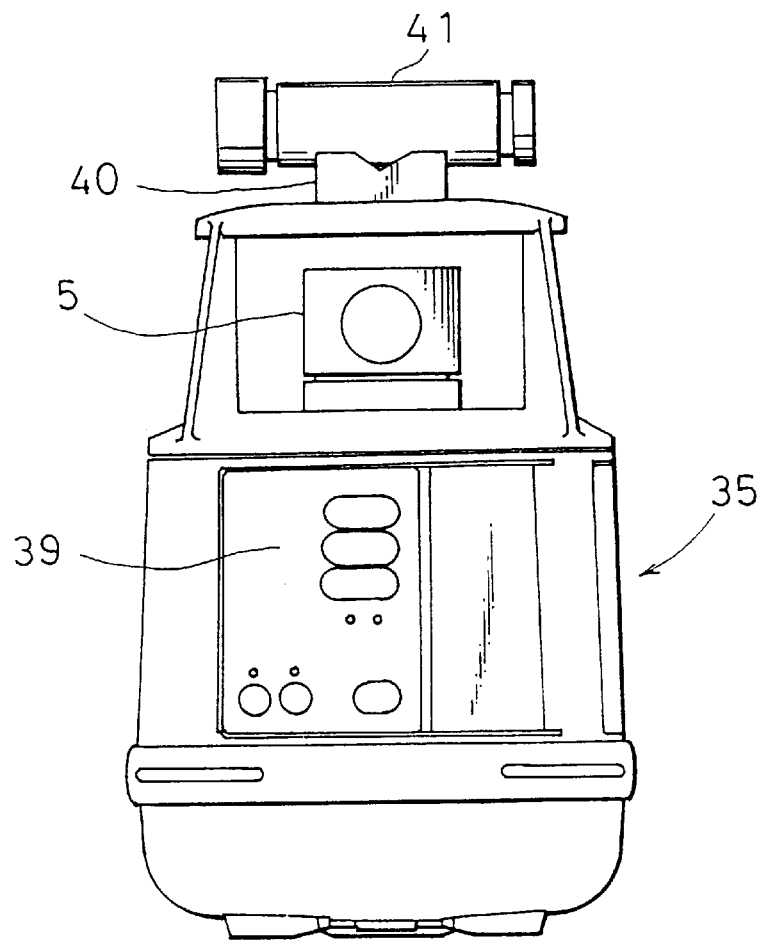
FIG. 1 is a front view of an embodiment of the present invention.
Figure 6:
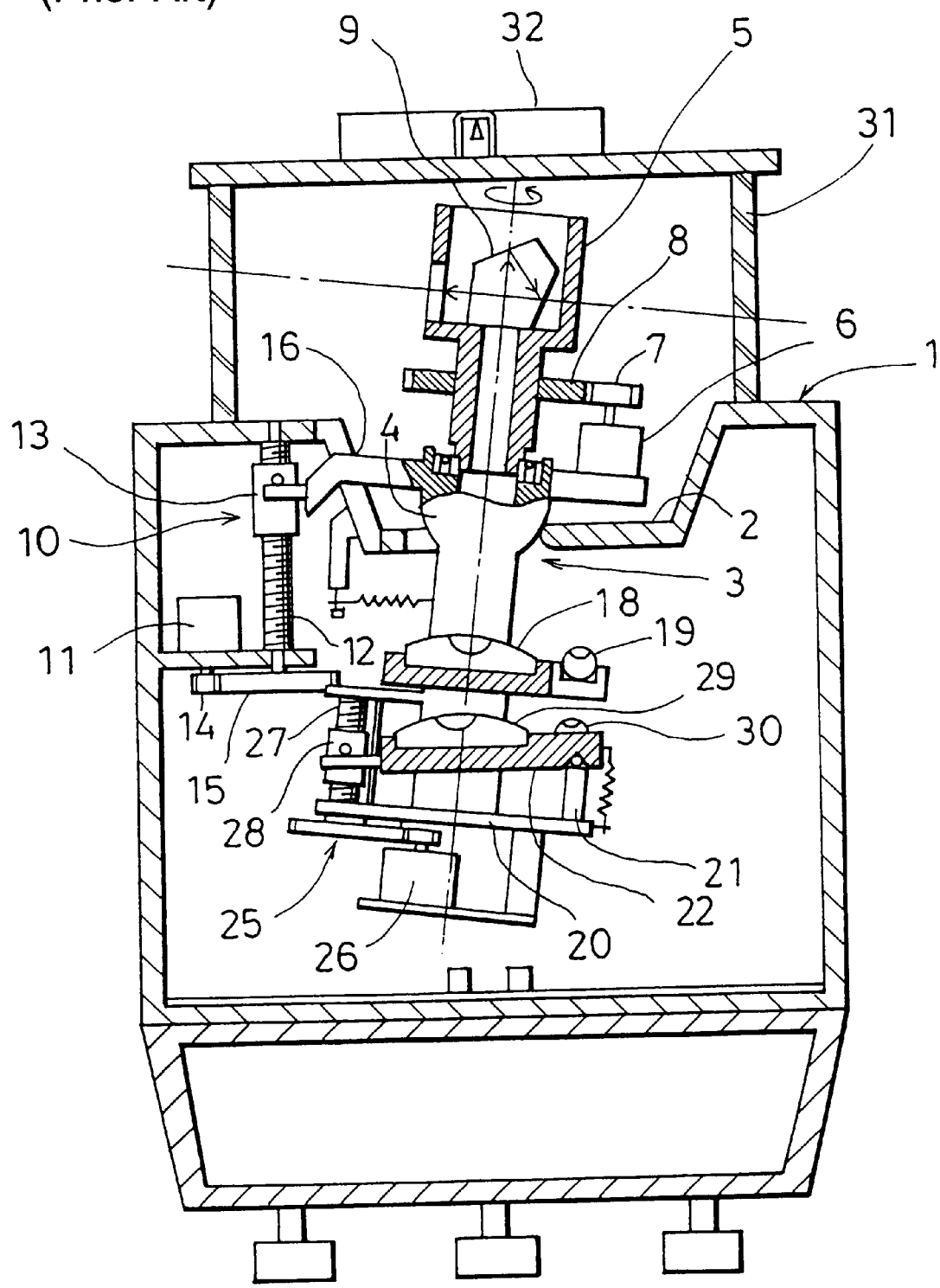
FIG. 6 is a cross-sectional view of a conventional type rotary laser irradiating system.
Figure 7A:
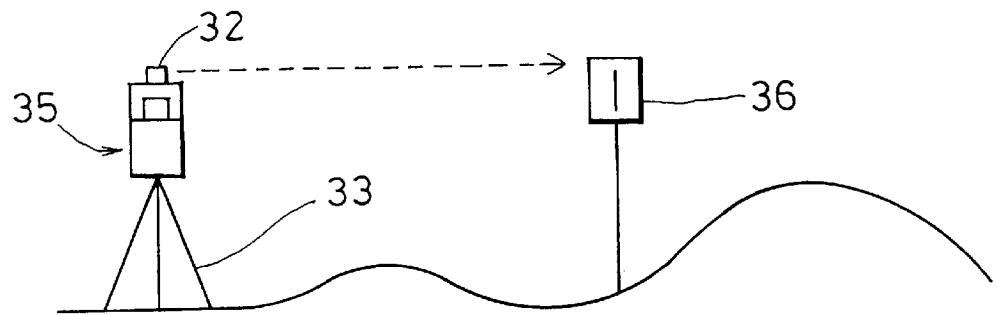
FIGS. 7(A), 7(B), 7(C) and 7(D) represents drawings to explain operation of tilt angle setting in the conventional system.
Figure 7B:
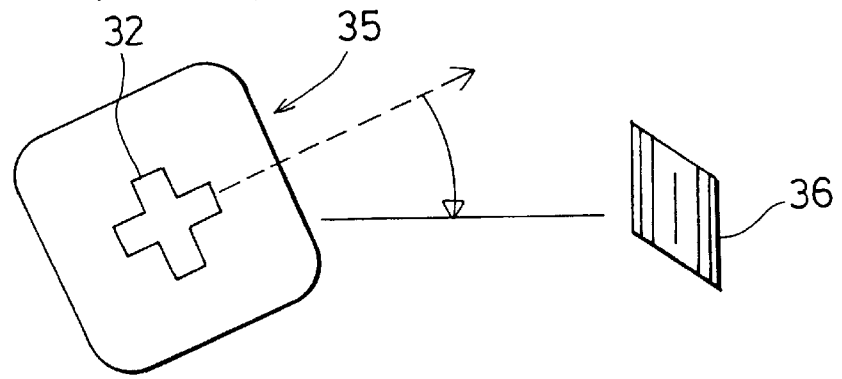
Figure 7C:
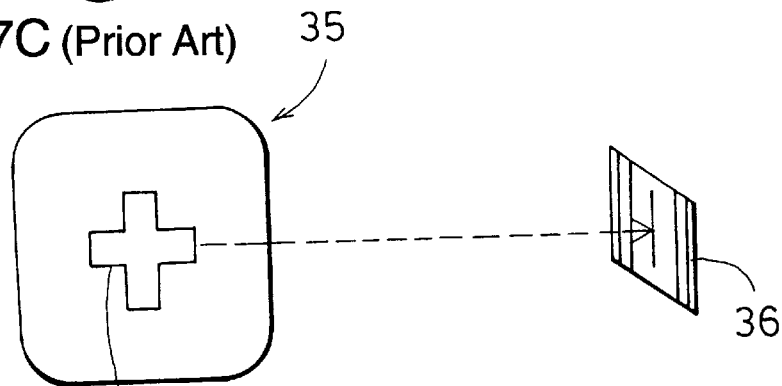
Figure 7D:
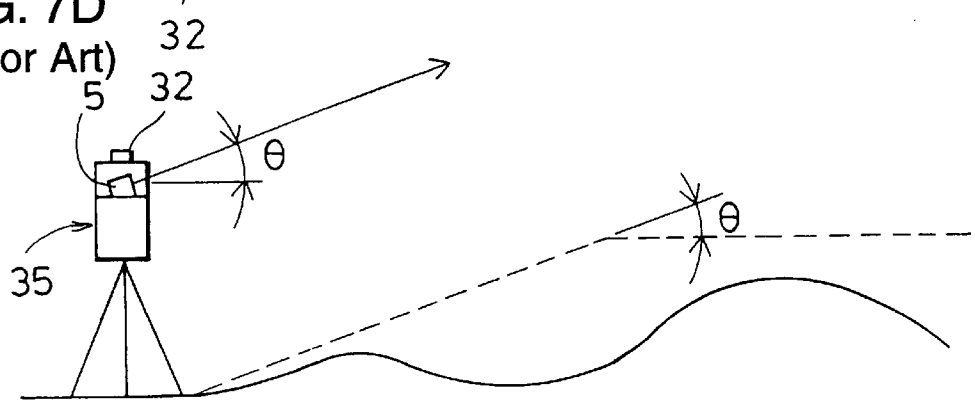

As shown in FIG. 1, on the upper surface of main unit of a rotary laser irradiating system 35, a collimating telescope 41 is rotatably mounted via a rotation base 40. An operation panel 39 is arranged on the front surface of the rotary laser irradiating system 35. By operating buttons on the operation panel 39, a tilt angle of the laser beam can be set. The arrangement of the rotary laser irradiating system 35 is the same as the system shown in FIG. 6, and detailed description is not given here.

Figure 2:
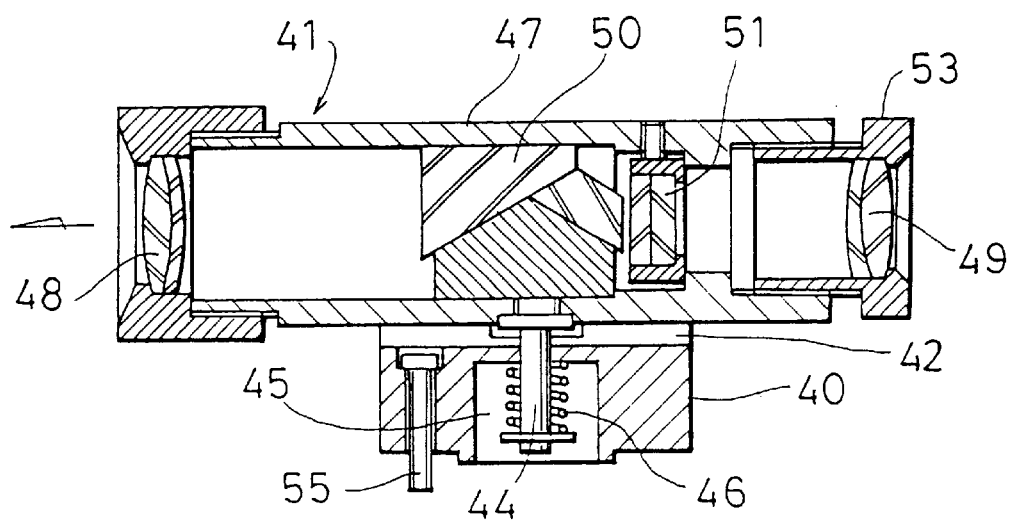
FIG. 2 is a cross-sectional view of a collimating telescope in the above embodiment.
Figure 3:
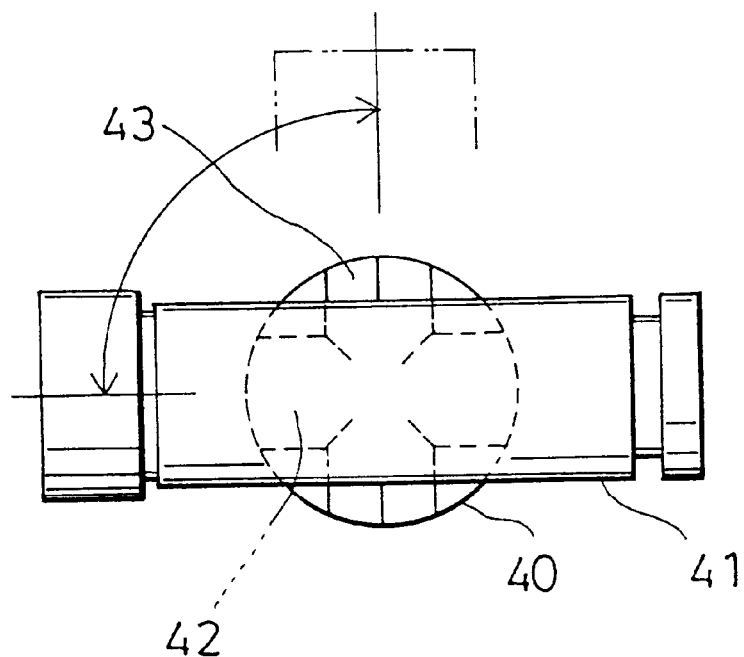
FIG. 3 is a plan view to show relationship between the collimating telescope and a rotation base to support the collimating telescope.
Figure 4:
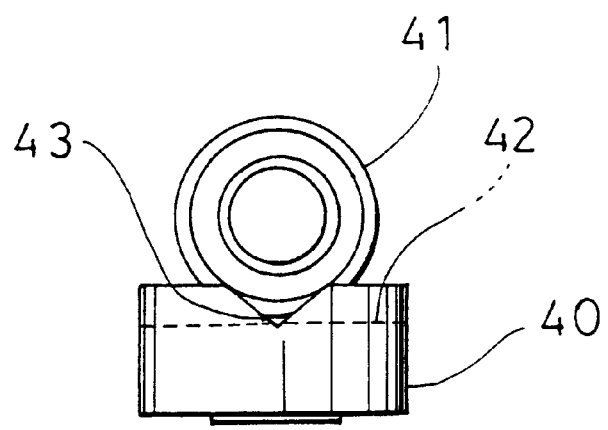
FIG. 4 is a side view to show relationship between the collimating telescope and a rotation base to support the collimating telescope.

Now, description will be given on the rotation base 40 and the collimating telescope 41 referring to FIG. 2 to FIG. 4.

On top surface of the rotation base 40, V-grooves 42 and 43 are formed in directions perpendicular to each other, and a counterbore 45 is formed at the center of the bottom surface of the rotation base 40. At the intersection of the V-grooves 42 and 43, a rotation shaft 44 is rotatably arranged to penetrate the rotation base 40 in a vertical direction. The lower end of the rotation shaft 44 protrudes into the counterbore 45. On the lower portion of the rotation shaft 44, a spring 46 is placed to push the rotation shaft 44 in a downward direction. On the upper end of the rotation shaft 44, the collimating telescope 41 is fixed, which is removably engaged in the V-grooves 42 and 43. The rotation base 40 is fixed on the upper surface of the rotary laser irradiating system 35 main unit by bolts 55. The axis of the rotation shaft 44 passes through the center of the spherical seat 4, i.e. the center of tilting of the laser projector 3, and directions of the V-grooves 42 and 43 are aligned with tilting directions by the two sets of tilting mechanisms 10 respectively.

Briefly describing the collimating telescope 41, an objective lens 48 is provided on the forward end of a lens-barrel 47, and an ocular lens 49 is arranged on the base end. Near the rotation center of the collimating telescope 41, an erecting prism 50 is disposed. Between the erecting prism 50 and the ocular lens 49, a focal mirror 51 having a collimation line such as cross is arranged. The ocular lens 49 is positioned in a lens holder 53, which is screwed in the lens-barrel 47. By turning the lens holder 53, the ocular lens 49 can be moved in the direction of the optical axis.

By the spring 46, the collimating telescope 41 is pushed toward the V-groove 42 via the rotation shaft 44, and positioning of the collimating telescope 41 is ensured by the V-groove 42. When it is wanted to rotate the collimating telescope 41 at an angle of 90°, rotating force is applied on the collimating telescope 41. When the rotating force exceeds the engaging force in the V-groove 42 applied by the spring 46, the collimating telescope 41 is moved out of the V-groove 42, and the collimating telescope 41 is made rotatable. When it is rotated at an angle of 90°, it is engaged in the V-groove 43. Being engaged in the V-groove 43, the collimating telescope 41 is positioned at a position rotated by 90°.

The magnification factor of the collimating telescope is designed to be not very high, being several times, and priority is given on the collimating function.

In the present embodiment, the collimating direction and the tilt setting of the rotary laser irradiating system 35 are performed by the same procedure as shown in FIG. 7.

Figure 5A:
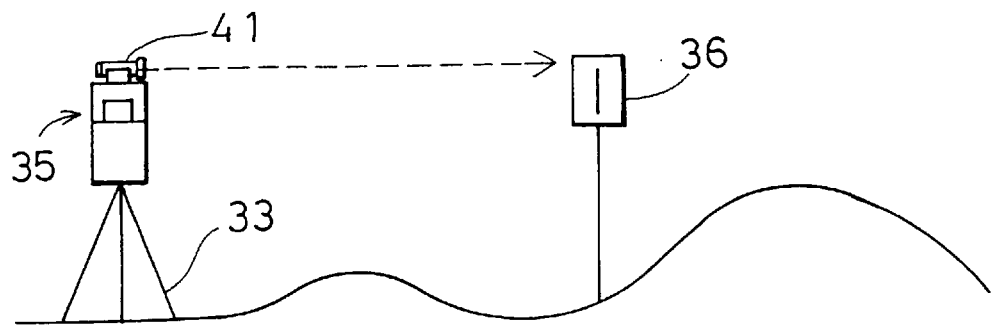
FIGS. 5(A), 5(B), 5(C) and 5(D) represents drawings to show operation of tilt angle setting in the present embodiment.
Figure 5B:
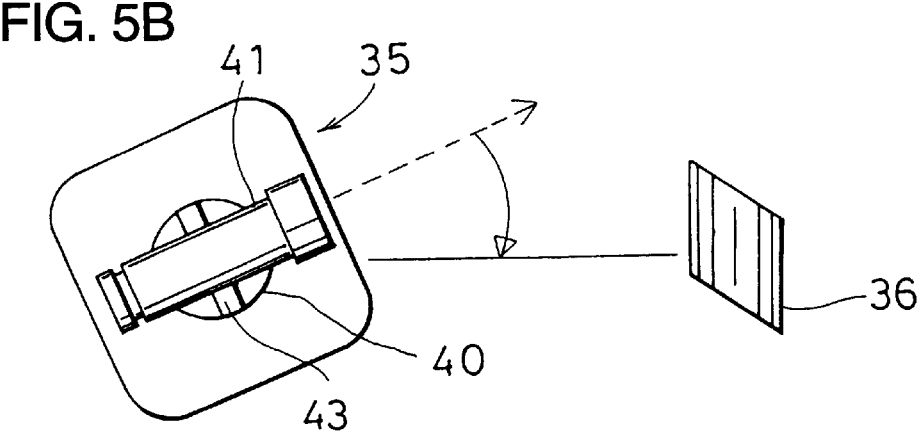
Figure 5C:
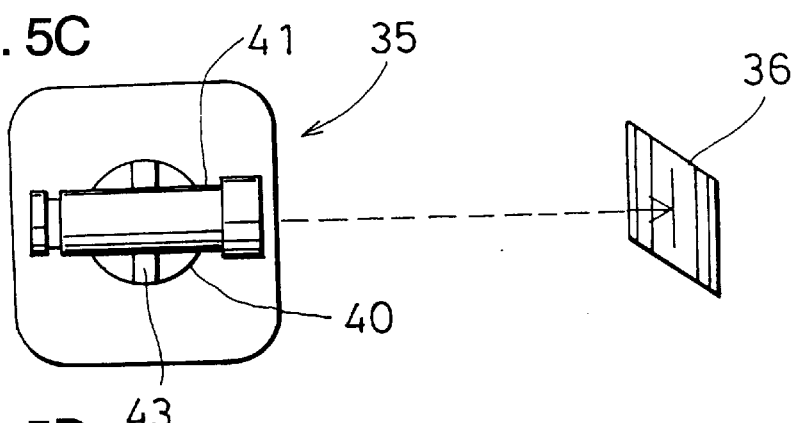

Specifically, the rotary laser irradiating system 35 is placed on the tripod 33, and a collimation target 36 is erected in a direction where tilting is to be set (FIG. 5(A)). In the initial setting, the collimating direction of the collimating telescope 41 is usually not directed toward the collimation target 36. The fixing screws on the tripod 33 are loosened to make the rotary laser irradiating system 35 main unit rotatable with respect to the tripod 33. While collimating by the collimating telescope 41, the rotary laser irradiating system 35 is rotated to align the collimating direction of the collimating telescope 41 with the collimation target 36 (FIGS. 5(B) and 5(C)).

Under the condition where the fixed tilt sensors 18 and 19 indicate a horizontal direction, a tilt angle of $\theta$ to be set is inputted from the operation panel 39, and tilting operation is started.

Figure 5D:
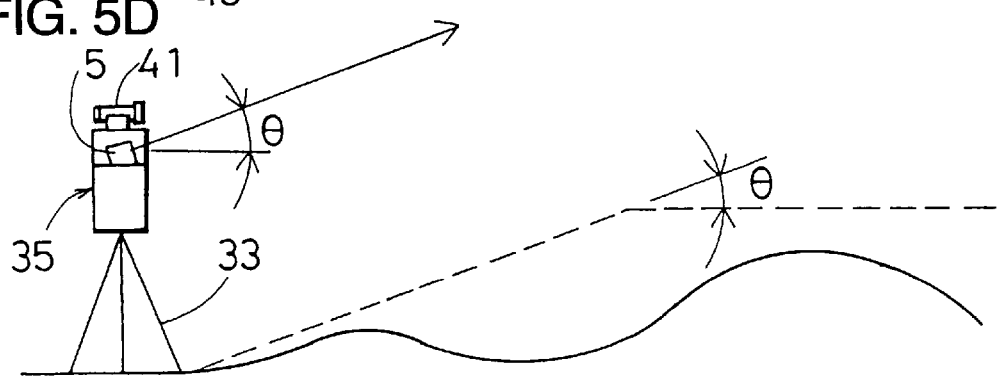

By the tilt setting mechanism 25 and the tilting mechanism 10, the laser beam irradiating direction is tilted to the preset angle of $\theta$ (FIG. 5(D)). Further, the rotator 5 is rotated, and rotary irradiation of the laser beam is performed, and a tilted reference plane is formed.

In case the collimation target 36 is erected at a position deviated at an angle of 90° with respect to the tilt setting direction, the collimating telescope 41 is rotated by 90° so that the collimating direction of the collimating telescope 41 is aligned with the collimation target 36. Under this condition, the tilt angle is set by the procedure as described above.

In the above, it is tilted in one direction. In case tilting is to be set in two directions perpendicular to each other, the tilt setting can be performed by operating the other tilting mechanism and the other tilt setting mechanism in addition to the tilting mechanism 10 and the tilt setting mechanism 25.

The present invention is also applicable for a rotary laser irradiating system, which is provided with only one set of tilting mechanism, and also for a system which has no tilting mechanism. In this case, it is possible to easily set reference lines which run in directions perpendicular to each other.

Further, the mechanism for positioning by turning the collimating telescope 41 at an angle of 90°, an arcuate guide groove of 90° may be formed on the rotation base 40 instead of the V-grooves 42 and 43. Then, a pin to engage in the arcuate guide groove may be protruded on the collimating telescope 41 so that the pin is positioned by the two ends of the arcuate guide groove and the collimating telescope 41 is rotated by 90° and is positioned. Thus, it is needless to say that various changes and modifications can be made for rotating by 90° and for positioning of the collimating telescope 41.

As described above, according to the present invention, the collimation target is collimated using the collimating telescope. As a result, accuracy of collimation is improved, and the collimating telescope can be rotated by 90°. Further, positioning can be carried out without man-made error, and this contributes to improvement of positioning and facilitates collimation to the collimation targets which are erected perpendicularly to each other.

What we claim are:

1. A rotary laser irradiating system, comprising a laser projector for performing rotary irradiation of a laser beam on a reference plane, a tilting mechanism for tilting said laser projector in predetermined directions, a collimating telescope for collimating in said predetermined directions, a rotation base where said collimating telescope is rotatably supported, and positioning means for supporting said collimating telescope in at least said predetermined directions, wherein said positioning means is mounted on said rotation base and comprises two grooves provided along the direction of the length of said collimating telescope and a spring for pushing said collimating telescope toward said rotation base, and said collimating telescope can be placed in or removed from said grooves.

2. A rotary laser irradiating system according to claim 1, wherein said tilting mechanism tilts in two directions perpendicularly to each other, and said positioning means supports said collimating telescope at least in said two directions perpendicular to each other.

3. A rotary laser irradiating system according to claim 1, wherein said collimating telescope is provided on the upper surface of said rotary laser irradiating system.

4. A rotary laser irradiating system, comprising a laser projector for performing rotary irradiation of a laser beam on a reference plane; a tilting mechanism for tilting said laser projector in predetermined directions; a collimating telescope for collimating in said predetermined directions, said collimating telescope comprising a rotation shaft; and a rotation base for rotatably supporting said collimating telescope, said rotation base having a counterbore formed therein, said rotation shaft protruding into said counterbore and having means for biasing said collimating telescope toward said rotation base.

5. The rotary laser irradiating system of claim 4, wherein said means for biasing said collimating telescope comprises a spring positioned about said rotation shaft.

6. The rotary laser irradiating system of claim 4, wherein said rotation base has a surface, and wherein said surface comprises first and second grooves formed therein for receiving said collimating telescope.

7. The rotary laser irradiating system of claim 6, wherein said first and second grooves are V-shaped grooves positioned perpendicularly to each other.

* * * * *